UNITED STATES PATENT OFFICE.

JAMES VALÉRE, OF PARIS, FRANCE, ASSIGNOR TO WILLIAM LUTWYCHE, OF LONDON, ENGLAND.

MANUFACTURE OF TRANSLUCENT ENAMEL.

SPECIFICATION forming part of Letters Patent No. 441,514, dated November 25, 1890.

Application filed January 21, 1890. Serial No. 337,645. (No specimens.)

*To all whom it may concern:*

Be it known that I, JAMES VALÉRE, artist in glass, a native of the French Republic, residing at 72 Avenue de la Grande Armée, Paris, France, have invented certain new and useful Improvements in the Manufacture of Translucent Enamel; and I do hereby declare the following to be a full, clear, and exact description of the invention.

My invention relates chiefly to the use of the materials employed in the preparation of translucent enamel. I am aware that translucent enamel has been already made; but I claim that by the use of the method and materials hereinafter described an article is produced superior in quality to any hitherto made. The translucent enamel so far produced has been in very few colors and the translucence has been comparatively ineffective; but by the methods hereinafter described I am able to produce translucent enamels of any desired color or shade. It is premised, however, that the operator must have experience in treating the materials and that the same materials treated by an ordinary enamel-maker may not produce the desired result.

In the production of white translucent enamels the following materials are employed and in approximately the proportions specified: one hundred and fifty to two hundred parts of minium, eighty to one hundred and twenty parts of boracic acid, fifty to eighty parts of oxide of zinc, thirty to forty parts of stannic acid, fifty to sixty parts of clean sand, twenty to thirty parts of finely-ground soda, five to ten parts of feldspar, five to ten parts of fluor-spar, four to eight parts of carbonate of potash, two to five parts of carbonate of lime, two to five parts of borax, and two to five parts of nitrate of soda. Add ten to thirty per cent. on the whole of glass-flux. The whole is mixed, melted in a crucible, and poured out onto a clean iron plate, after which it is broken up in a mortar and then ground to a fine powder. I find that the use of fluor-spar, carbonate of potash, and borax materially improves the translucence of the enamel.

For colors the above materials, ground or unground, according to the amount required, are placed in a crucible and the following coloring-matters added: for brown, black oxide of manganese; for pink, purple of cassius; for red, red oxide of iron; for yellow, chromate of lead; for blue-black, cobaltic oxide; for green, red oxide of copper; for turquoise, black oxide of copper. The whole is then melted and ground, as already described.

The various tints and shades are made by varying the quantity of coloring-matter introduced.

The material is applied to the glass or other material in the form of a paste, which is made by mixing the fine enamel-powder with water and applying the same to the surface of the glass or other material by means of a brush or spatula. The glass may be either with or without a traced line. It is then placed in a kiln and fired until the enamels are melted and left on the glass in relief.

Having now particularly described and ascertained the nature of my said invention and in what manner the same is to be performed, I declare that what I claim is—

1. The composition for translucent enamel, consisting, essentially, of minium, boracic acid, oxide of zinc, stannic acid, clean sand, soda, feldspar, fluor-spar, carbonate of potash, carbonate of lime, borax, nitrate of soda, and a suitable flux, substantially as described.

2. A composition for the manufacture of translucent enamel, which consists of fluor-spar, carbonate of potash, and borax in admixture with other suitable ingredients composing an enamel, substantially as described.

In testimony that I claim the foregoing I have hereunto set my hand this 25th day of July, 1889.

JAMES VALÉRE.

Witnesses:
J. L. RATHBONE,
R. J. PRESTON.